US006779539B1

(12) United States Patent
Schwamberger et al.

(10) Patent No.: US 6,779,539 B1
(45) Date of Patent: Aug. 24, 2004

(54) DISPENSING APPARATUS FOR DELIVERING CONTROLLED AMOUNTS OF WATER SOLUBLE MATERIAL TO A PROCESS STREAM

(75) Inventors: John F. Schwamberger, West Chester, OH (US); Edward R. Bowden, Hamilton, OH (US)

(73) Assignee: JohnsonDiversey, Inc., Sturtevant, WI (US)

( * ) Notice: Subject to any disclaimer, the term of this patent is extended or adjusted under 35 U.S.C. 154(b) by 0 days.

(21) Appl. No.: 10/375,749

(22) Filed: Feb. 26, 2003

(51) Int. Cl.[7] .............................................. B01D 11/02
(52) U.S. Cl. ........................ 137/1; 137/268; 137/334; 137/563; 422/281; 422/284
(58) Field of Search ................. 137/268, 334, 137/563; 422/281, 284, 285, 264

(56) References Cited

U.S. PATENT DOCUMENTS

| 1,198,541 A | * | 9/1916 | Hardesty | 422/281 |
| 6,468,481 B1 | * | 10/2002 | Anderson | 422/281 |
| 6,555,074 B1 | * | 4/2003 | Sweet | 422/281 |

* cited by examiner

Primary Examiner—Kevin Lee
(74) Attorney, Agent, or Firm—Wood, Herron & Evans, L.L.P.

(57) ABSTRACT

An apparatus to dispense water soluble compositions into a process stream involves recirculating water through the water soluble chemical held in a tank. The recirculating water is heated to establish a defined temperature and repeatedly recirculated through the bed of chemical to achieve relative saturation concentration of the recirculating water. The water is dispensed from the recirculating unit thereby achieving a consistent concentration of chemical in the dispensed water.

12 Claims, 2 Drawing Sheets

DISPENSING APPARATUS FOR DELIVERING CONTROLLED AMOUNTS OF WATER SOLUBLE MATERIAL TO A PROCESS STREAM

FIELD OF THE INVENTION

Chemicals are added to processing streams to accomplish a wide variety of goals. These chemicals may be detergents, surfactants, bleaching agents, biocides as well as a variety of other chemicals. A commonly used method to dispense chemicals into a process stream is to start with a solid material and dissolve a portion of the solid material and then inject the formed solution into the process stream. This is a relatively simple way of adding a soluble solid chemical to a liquid stream.

In actuality, this dispensing method has many different problems. Typically the water is added to one end of a holding tank and passes through the solid and is recovered from the opposite end of the holding tank. Because of the nature of water flow, it tends to channel through the bed of solid material providing limited contact between the water and the solid.

Further, solubility changes dramatically with temperature. As a result, the concentration of the liquid added to the process stream is extremely inconsistent. Variations of 50% to 60% are common. Variations in concentration is at best wasteful. More likely it can lead to much worse consequences. With biocide treatment concentration variation can cause dramatic increases in bacteria levels. This can damage equipment and products.

The apparatus typically used in these dispensing systems is also problematic. Generally the tanks are pressurized. Pressurization forces the water through the tank into the process stream. A pressurized tank of dissolved processing chemicals is inherently dangerous. Further, the tank generally must be relatively tall, otherwise there will not be adequate physical contact between the liquid and the solid. Frequently these need to be fifteen feet or taller which requires a special room. The tank height and its pressurization also makes it more difficult to load the tank with additional solid chemical. The system generally must be shut down and at least partially drained to add additional solid chemical. Draining concentration and liquid solutions to cover is problematic. It can cause environmental damage and can harm bacteria used in waste water treatment facilities.

SUMMARY OF THE INVENTION

The present invention is premised on the realization that a uniformed concentration of dissolved chemical can be obtained in an aqueous stream by recirculating an aqueous stream through a tank holding the solid chemical. By passing the solution repeatedly through the tank, a uniform concentration can be achieved at atmospheric pressure. Further, a heater is employed within the recirculation loop of the apparatus to establish a desired temperature. This stabilizes the concentration of the solute in the solution, again improving the consistency of the concentration.

In a preferred embodiment, the tank employs a gravel bed or other water dispersion system at the base of the tank. The water is injected through the gravel bed distributing the water evenly across the diameter of the bed. The solution is recovered from the top of the bed after passing through the solid material. This provides for even distribution and avoids the channeling incurred with prior art apparatus.

Further, the apparatus of the present invention, since it uses a recirculation loop, employs a separate pump allowing the tank to be maintained at atmospheric pressure. This eliminates the inherent safety problem associated with maintaining a pressurized tank of dissolved chemicals.

The objects and advantages of the present invention will be further appreciated in light of the following detailed description and drawings in which:

DETAILED DESCRIPTION

The present invention is a method and apparatus for dispensing water soluble chemicals into a process stream. For purposes of the present invention, process stream refers to a wide variety of different applications and include basically any aqueous based systems. Exemplary systems would include paper processing, cooling towers, boiler water treatment, drinking water treatment, waste water treatment, food manufacture and warewashing.

The present invention describes as a preferred embodiment which is the application of biocides to a paper processing operation. However, this is merely exemplary and the present invention should no,t be limited to this particular application.

The water soluble composition used in the present invention can be a wide variety of different chemical compositions. These could include detergents, minerals, surfactants, biocides, flocculents various mixtures and Typical biocides include halohydantoins, such as bromomethyl halohydantoin, chloromethylhalohydantoin, and other biocides such as calcium hypochlorite, dibromonitylpropylamine, glutaraldehyde salts as well as many other well known biocides. These can be applied at various well-known locations in the process stream and the particular point of application forms no part of the present invention.

Figure 1:
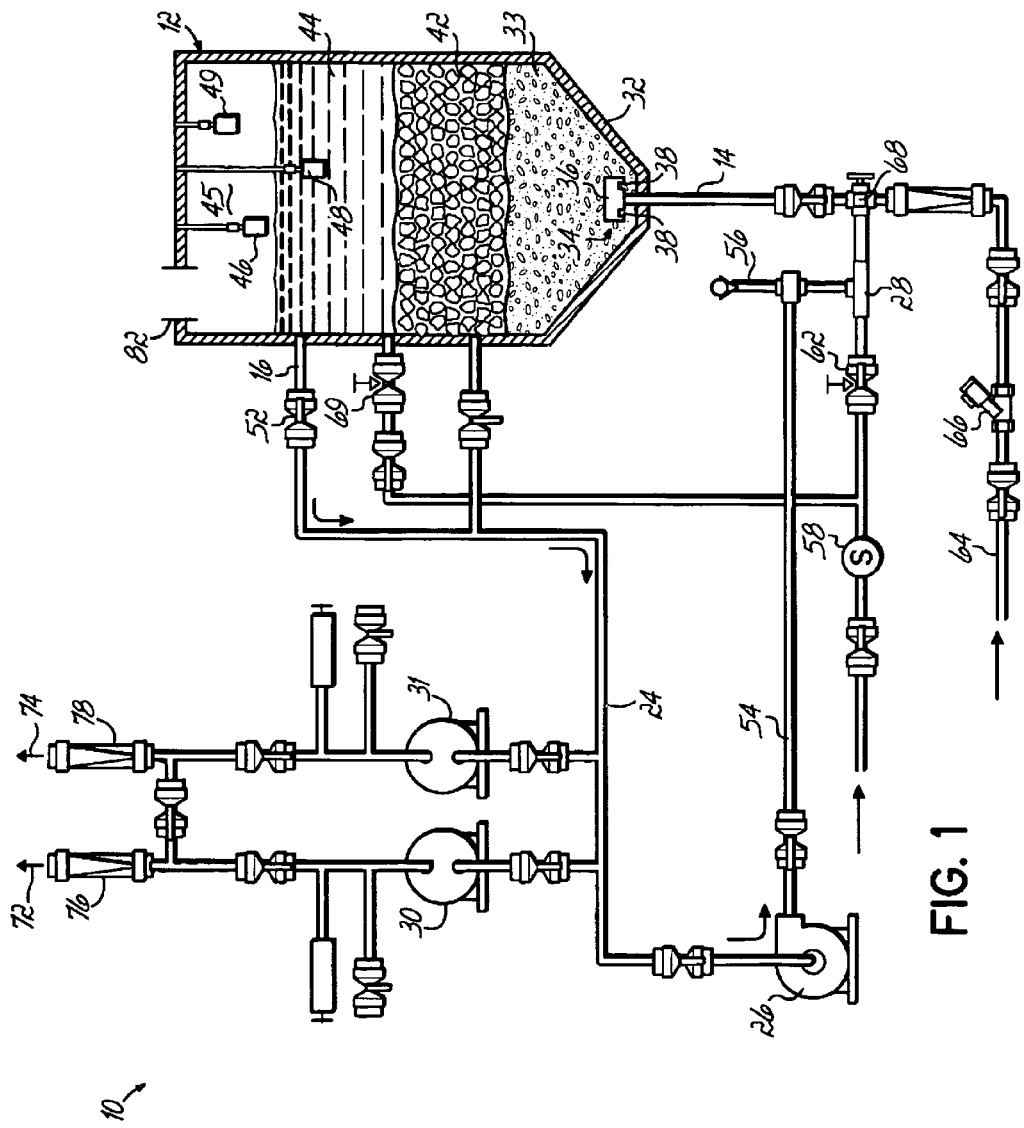
FIG. 1 is a diagrammatic depiction of the present invention.

Shown more particularly in FIG. 1, the present invention includes a water tank 12 which includes an inlet 14, a primary outlet 16 which leads to injection pumps 18 and 22. The discharge line 24 from outlet 16 also leads to a recirculating pump 26 which pumps fluid through a heater 28 back to the tank inlet 14.

The tank 12 is made from any chemically resistant material. It can be metal or a plastic material or can be lined as desired depending upon the material being distributed. The base 32 of the tank 12 is an inverted truncated cone which is designed to provide for even distribution of the injected water throughout the base of the tank 12. More particularly water inlet 14 has a dispersing head 34 which includes a cap 36 with multiple water outlets 38 which direct the incoming water downwardly. Also, the lower portion 32 of tank 12 is designed to disperse the water throughout the base of the tank.

As shown, a gravel bed 33 is used. Other means to disperse water include baffles or a series of plates with water distribution holes drilled throughout. These simply provides for even water flow throughout the base of the tank.

Above the gravel bed 33 is a bed of the water soluble material 42 preferably in the form of briquettes, pellets or tablets. A pool of water 44 above the bed 42 of briquettes.

An air space 45 is at the top of the tank 12. The tank includes high and lower water sensors 46 and 48 and an emergency sensor 49 to provide a warning emergency and/or shut down. The top of the tank also includes an inlet or hatch 82 to allow the operator to manually place additional briquettes into the tank 12.

Water is directed through outlet 16 and valve 52 through line 24. This water flow is continuous and maintained by recirculating water pump 26. A magnetic drive centrifuge pump or an air driven double diaphram pump is suitable for this application.

Pump 26 directs the water through line 54 through heater 28 which, as shown, is a steam mixing valve and then back through line 14 to the base 32 of tank 12. A temperature sensor 56 is used to control the operation of heater 28.

Heater 28 includes a steam source 58 which directs steam as needed through needle valve 62 to the heater 28 to maintain constant temperature of the inlet water. This steam is mixed with the recirculating water to maintain the desired temperature.

When the pool water 44 is below sensor 48, water is added through line 64 controlled by air valve 68. The water flows through valve 68 into line 14 into the bottom 32 of tank 12. Again, as the inlet water is being fed through valve 68, steam can be added from heater 28 through valve 68 to establish a desired temperature for the inlet water if desired. If the water temperature in tank 12 needs to be increased, needle valve 69 can be opened along with valve 62 to heat the liquid in tank 12.

Pumps 30 and 31, when needed, direct the recirculating solution from line 24 to injection ports upstream as indicated by arrows 72 and 74. The amount can be determined through flow meters 76 and 78. Pumps 30 and 31 are preferably variable speed diaphram pumps or air operated double diaphram pumps to provide uniform flow.

In order to provide maximum efficiency, the diameter of tank 12 relative to the height of the briquette bed should be greater than 1:1 and generally 1.5 to 1 to about 2 to 1. This provides for optimum distribution of the water through the bed of briquettes and therefore optimum dissolution of the material.

The temperature of the water within tank 12 can be maintained at any desired level. Generally it can be anything above 0 up to boiling. However, for practical applications it will be above room temperature and up to about 110° F. with about 70–110 being preferred with 80–95 the most preferred range. This depends upon the material being dissolved. These optimum ranges are for the halohydantoins.

The chemical is obviously a solid and is preferably a briquette, tablet or pellet. Granules can also be used. The term briquette is considered exemplary of the physical form of the chemical. The briquettes can be added to the tank 12 during operation because the tank itself is at atmospheric pressure and there is an airspace 45 above the water level 44. Thus, to add additional material, one simply opens port 82 and pours additional briquettes into the tank 12. This can also be done with a conveyor system if desired.

In the operation of the present invention, it is preferred that on average the water makes at least two passes through tank 12 prior to being drawn off by pumps 30 and 31. In other words, there is a recirculation to discharge ratio of at least 2:1 and preferably about 4 to 1 in order to ensure product saturation in the liquid discharged into the process stream at the defined temperature. This may change depending on the particular chemical being dispensed as well as the temperature.

Further, in order to maintain its optimum concentration, it is important that the incoming water should be limited to 10%–25% greater than discharge flow. Additional water is added to the system when pumps 30 and 31 are in operation.

Figure 2:
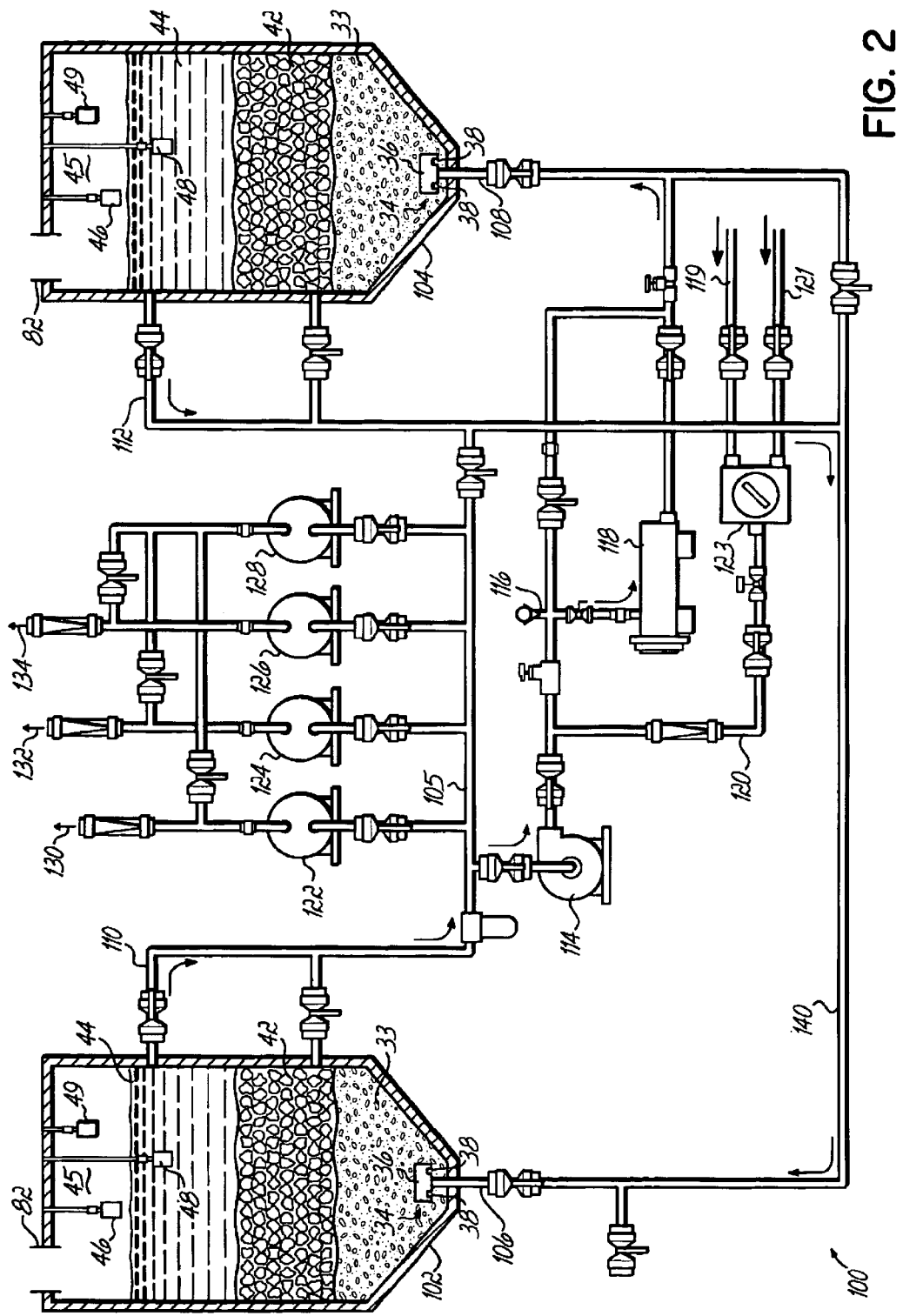
FIG. 2 is a diagrammatic depiction of an alternate embodiment of the present invention.

FIG. 2 shows an alternate embodiment 100 of the present invention designed to dispense a larger amount of treatment chemical. Two tanks 102 and 104 are used, both with bottom water inlets 106 and 108 respectively. Again, these will utilize water outlets 110 and 112 with outlet 110 leading to a recirculation pump 114. Outlet 112 leads to line 140 and into tank 102.

Pump 114 directs water past a temperature sensor 116 through an electric heater 118 which then directs water back through line 108. Additional inlet water can be provided through line 120 from either hot or cold water inlets 119, 121 through tempering valve 123. This system employs four separate discharge pumps 122, 124, 126 and 128. In this embodiment there are three discharge ports 130,132 and 134. Pump 128 acts as a backup pump in the event any of pumps 122, 124 or 126 is disabled.

Again system 100 operates in the same manner as the apparatus 10 disclosed in FIG. 1 with the exception that the water is injected through both ports 106–108 into tanks 102 and 104. Liquid from tank 102 flows through line 110 and is directed to recirculating pump 114 which directs the water through heater 118 to inlet 108. Discharged water from tank 104 flows via outlet 112 back through line 140 and directly back into the first tank 102 through line 106. Line 140 acts to equalize the water level in the two tanks.

Anytime solution is required for dispensing into the process flow, pumps 122–126 can be selectively operated. Whenever temperature sensor 116 detects a low temperature in the recirculating water, heater 118 is activated to establish a constant temperature. Additional temperature probes as well as sample ports can be employed throughout the system and can be employed for example in tank 104, 102 or in any of the process streams. Additional tanks, pumps and heaters can be added as needed to increase capacity. This in turn can all be controlled by a outside controller using a PLC controller ORP meter, total chlorine meter or a DCS system.

The present invention provides many different advantages. The use of a flow distribution medium bed at the base of the tank provides even distribution of water and uniform flow through the briquettes. This reduces or eliminates channeling and improves product concentration and dissolution efficiency. This in turn allows a shallower briquette bed to be used.

The recirculation system providing multiple passes of the water through the briquette bed ensures product saturation at the established temperature and thus uniform concentration in the discharge stream. Recirculating the water at least twice through the briquette bed prior to discharge further ensures saturation.

The use of the heater which maintains the temperature of the recirculating water establishes a consistent known concentration. Thus, by recirculating the water and controlling the temperature one can control the concentration of the solute in the recirculating stream. In turn, by controlling the amount of liquid added to the processing stream, one provides a reliable application rate of the particular chemical.

The present invention operates at atmospheric pressure which is significantly safer than a system using a pressurized tank of process chemicals. The system also allows for multiple bags of product to be charged into the unit in a single operation. Thus, the present invention significantly improves efficiency, reduces costs and improves safety.

This has been a description of the present invention along with the preferred method of practicing the invention. The invention itself should only be defined by the appended claims whereby we claim:

What is claimed is:

1. An apparatus for adding a water soluble chemical to a process stream comprising:
   a first holding tank adapted to hold said chemical;
   a recirculating water loop comprising:
   a) a water inlet into a bottom portion of said tank;
   b) an outlet from an upper portion of said tank leading to said process stream;
   c) a pump effective to pump water from said outlet into said inlet; and a makeup water inlet line to direct fresh water into said tank.

2. The apparatus claimed in claim 1 wherein said recirculating water loop further includes a heater adapted to maintain a defined temperature within said tank.

3. The apparatus claimed in claim 1 wherein said tank further includes a water disperser in the base of said tank wherein said water is introduced into said water disperser.

4. The apparatus claimed in claim 3 wherein said water disperser comprises a gravel bed.

5. The apparatus claimed in claim 1 wherein said tank has a height to diameter ratio of at least about 1.5:1.

6. The apparatus claimed in claim 1 wherein said tank has a conical base.

7. The apparatus claimed in claim 1 further comprising a second holding tank adapted to hold said chemical wherein said recirculation loop extending through said second holding tank.

8. A method of dispensing water soluble chemicals in a process stream comprising holding said chemical in a holding tank, recirculating water through said chemical in said tank, establishing a defined temperature for said water recirculating through said tank, introducing said recirculating water into said process stream.

9. The method claimed in claim 8 further comprising establishing a recirculation to discharge ratio of at least about 2:1.

10. The method claimed in claim 8 further comprising establishing a water level in said tank and withdrawing water from an upper portion of said tank and introducing water into a bottom portion of said tank.

11. The method claimed in claim 10 further comprising passing said water upwardly through a disperser in the base of said tank.

12. The method claimed in claim 10 wherein said water level is above said water soluble chemical in said tank.

* * * * *